Nov. 8, 1955 L. F. MAYLE 2,723,347
PULSE KEYING CIRCUIT FOR POWER AMPLIFIERS
Filed Aug. 25, 1951
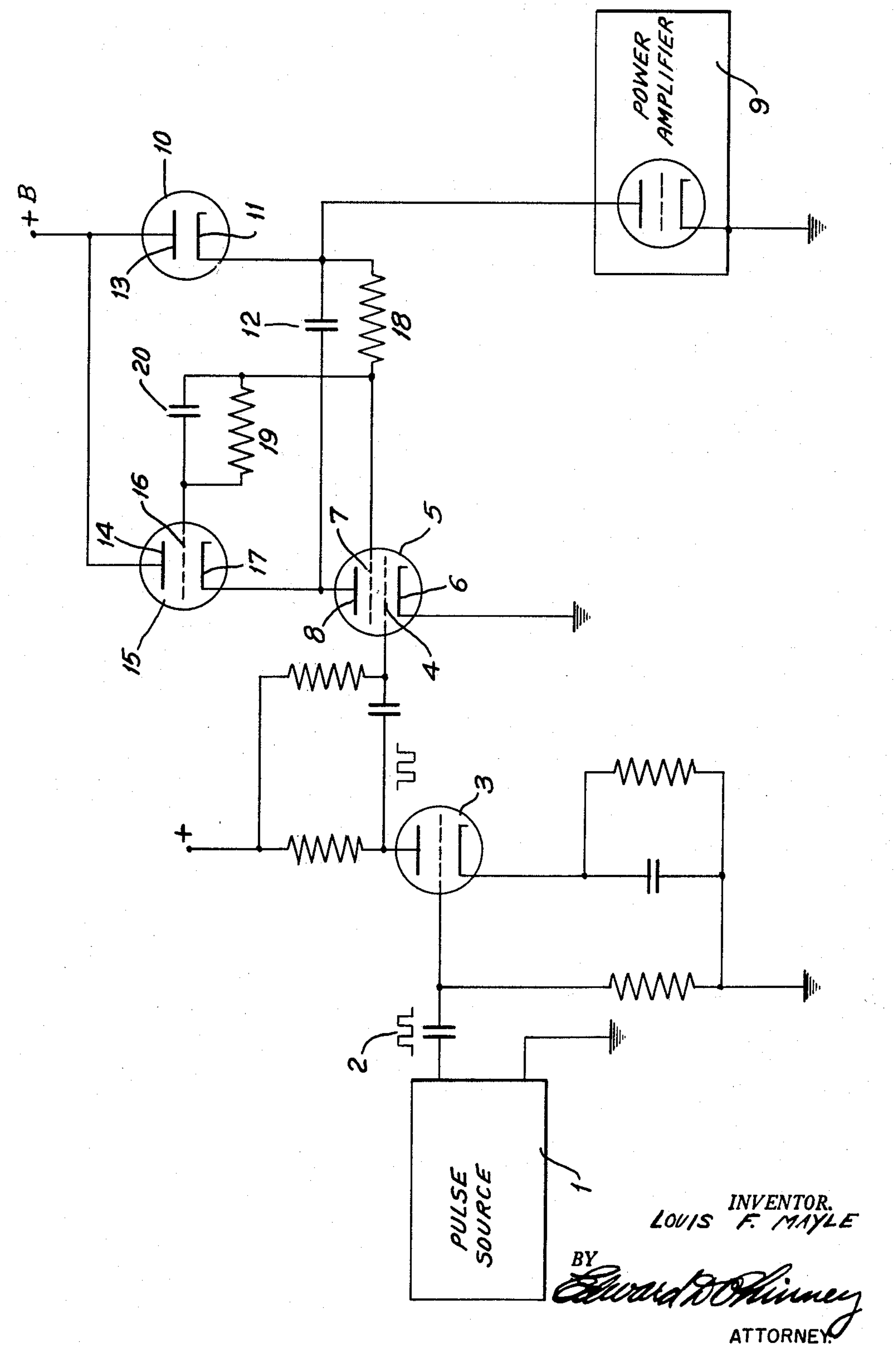
INVENTOR.
LOUIS F. MAYLE
BY Edward D. Phinney
ATTORNEY.

2,723,347

PULSE KEYING CIRCUIT FOR POWER AMPLIFIERS

Louis F. Mayle, Fort Wayne, Ind., assignor to Farnsworth Research Corporation, Fort Wayne, Ind., a corporation of Indiana Application August 25, 1951, Serial No. 243,716

2 Claims. (Cl. 250—27)

This invention relates to pulse keying circuits and more particularly to circuits particularly useful for inserting synchronizing pulses into amplifier circuits.

In a previous system exemplified in my prior U. S. Patent No. 2,442,304, granted May 25, 1948, there is described a circuit arrangement for inserting a synchronizing pulse into a power amplifier which may be used for television signals or the like. In accordance with this prior system the plate supply for the power amplifier passes through rectifier to the power amplifier and at the same time charges a condenser substantially to this supply potential. A normally inoperative gas discharge tube is bridged across the condenser-rectifier combination. The synchronizing pulses are applied to the grid of this gas tube causing it to fire and simultaneously are applied to the anode of this gas tube. A choke coil is included in the anode circuit so that the trailing edge of the synchronizing pulse will serve as a quenching voltage to extinguish the tube after the pulse has passed. Although this circuit itself is satisfactory there are certain disadvantages inherent in the use of gas tube arrangements for this purpose. Gas filled tubes are relatively slow in operation due to the de-ionization time so that the synchronizing pulses cannot be made of very narrow widths or short time duration. Furthermore, the gas tubes are somewhat erratic in operation and their sensitivity may be varied by the temperature conditions of the gas and by other external influences.

It is an object of this invention to provide keying circuits for inserting pulses in an amplifier arrangement utilizing a rectifier and condenser arrangement wherein there are applied high vacuum tubes for effecting the switching action for inserting the pulses in response to the application of pulses from a pulse source.

In accordance with a feature of my invention a circuit is provided wherein the operating voltage for an amplifier is supplied through the medium of a rectifier, preferably a diode, which is also connected with a storage device such as a condenser, a normally blocked electron discharge device being connected in shunt to the rectifier condenser so that the storage device becomes charged to a predetermined potential; the system being provided with a pulse responsive electron discharge device having its anode connected to the condenser and to the first electron discharge device for rendering the first electron discharge device conductive in response to the pulses and simultaneously blocking the rectifier so that a voltage substantially equal to the voltage charge on the storage device and the voltage of this source is applied to the amplifier.

In accordance with a further feature of a circuit according to this invention the second electron discharge device may be provided with a screen grid and under normally operating conditions the second device is conductive from the screen grid through the cathode thereof. The screen grid is connected to the control grid of the first electron discharge device thereby maintaining it normally blocked. Negative pulses are applied to the control grid of the second discharge device cutting it off and making the screen grid and anode positive whereby a positive potential is applied to the control grid of the first electron discharge device rendering it conductive. At the same time the positive potential of the screen is applied to the cathode of the rectifier so that the rectifier is no longer effective to supply the voltage for the amplifier and the voltage is therefore passed through the first electron discharge device and the storage condenser in series.

The above-mentioned and other features and objects of this invention and the manner of attaining them will become more apparent and the invention itself will be best understood by reference to the following description of an embodiment of the invention taken in conjunction with the accompanying drawing, the single figure of which is a schematic circuit diagram of a circuit embodying this invention.

The drawing shows a pulse source 1 which supplied positive pulses 2 to a control grid of a conventional amplifier tube 3. These amplified pulses are applied as negative pulses to a control grid 4 of electron discharge device 5 which is also provided with a cathode 6, the screen grid 7 and anode 8. The power supply for a power amplifier 9 is supplied through a rectifier 10 to this amplifier. The cathode 11 of rectifier 10 is also connected to a storage device shown as condenser 12. The anode 13 of rectifier 10 is connected directly to the anode supply voltage. A second electron discharge device 15 has also a control grid 16 and a cathode 17 and an anode 14 which is also connected to the anode supply voltage. Under normal conditions of operation a positive potential from the supply source also is furnished through rectifier 10 and a resistor 18 to the screen grid 7 of electron discharge device 5. Under these conditions in the absence of pulses applied to the control grid 4 electron discharge device 5 is conductive from the screen grid 7 through cathode 6, the drop across this path being equal to the normal voltage applied to amplifier 9. The anode 8 of electron discharge device 5 is connected to cathode 17 of device 15 and the screen grid 7 is connected through a resistor 19 shunted by a condenser 20 to the control grid of electron discharge device 15. Since the device 5 is conductive from screen grid 7 a negative bias is applied to control grid 16 so that the eelctron discharge device 15 is normally blocked.

When the amplified negative pulses from source 1 are applied to control grid 4 of electron discharge device 5 this tube becomes blocked and the screen grid 7 becomes positive. At the same time the positive voltage of screen grid 7 is applied to the grid 16 of electron discharge device 15 through the parallel combination of capacitor 20 and resistor 19. Immediately as grid 16 becomes positive, electron discharge device 15 becomes conductive or its impedance becomes very low, making its cathode 17 approach the anode supply voltage. Due to the fact that capacitor 12 is charged almost to the anode supply voltage, the cathode 11 of rectifier 10 is raised to almost twice the anode supply voltage, thus rendering rectifier 10 non-conductive. As a consequence the potential supplied to the power amplifier is almost doubled being equal to the sum of the voltage from the power source and the voltage charge on condenser 12. Thus the high voltage pulse is inserted into the amplified energy in amplifier 9. As soon as the synchronizing pulse has passed the negative voltage it is removed from control grid 4 of electron discharge device 5 and the device again becomes highly conductive. The screen grid is, therefore, pulled down near ground potential leaving the grid side of condenser 20 below ground potential so that the grid to cathode voltage of electron discharge device 15 is way beyond cut-off rendering this device non-conductive. As soon as electron discharge device 15 is cut-off the diode 10 becomes conductive and normal power supply voltage is again supplied to the power amplifier 9. Condenser 12 is then again charged substantially to the supply voltage through electron dicharge device 5 which is now highly conductive. When the leading edge of the next synchronizing pulse reaches grid 4 the process described above is again repeated.

It will be clear that by the arrangement shown herein a rapidly operating pulsing circuit is provided utilizing high vacuum tubes which are not dependent upon deionization time for operation. Furthermore, a more stable system is provided than that of the prior art.

It will be understood that while I have illustrated a tetrode as the controlling tube for the circuit any type of screen grid tube may be used. Moreover, although a diode tube has been illustrated as a rectifier other types of rectifier arrangements may be used without departing from the scope of my invention.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A pulse keying circuit for an amplifier comprising a source of supply voltage for said amplifier, a rectifier having an anode electrode connected to said source and a cathode electrode connected to said amplifier, a condenser having one plate connected to said cathode electrode, a first electron discharge device, having an anode electrode connected to the other plate of said condenser, a screen grid connected through a resistor to said cathode electrode, a control grid and a cathode, whereby said device is normally conductive between its screen grid and cathode, a second electron discharge device having a cathode connected to the anode of said first device, a grid connected through a resistor to the screen grid of said first device, and an anode connected with the anode of said rectifier, whereby said second device is normally non-conductive, and means for applying negative potential pulses to the control grid of said first electron discharge device, whereby said first device is cut-off, said second device is rendered conductive and said rectifier is cut-off, producing a series connection from said source through said condenser to said amplifier.

2. A pulse keying circuit for an amplifier comprising a condenser, a source of voltage, a charging circuit for said condenser comprising a rectifier connected between one side of said source and one side of said condenser and an electron discharge device connected between the other side of said source and the other side of said condenser, said rectifier and said electron discharge device being similarly poled and normally conductive to charge said condenser in a given direction, means conductively interconnecting said electron discharge device and said rectifier for rendering said device normally conductive in response to conduction by said rectifier, a second normally blocked electron discharge device connecting the first side of said source with the other side of said condenser, means for blocking the charging circuit and simultaneously rendering conductive said second electron discharge device, and output connections between said one side of said condenser and the said other side of said source.

References Cited in the file of this patent

UNITED STATES PATENTS

| | | |
|---|---|---|
| 2,239,786 | Jones | Apr. 29, 1941 |
| 2,442,304 | Mayle | May 25, 1948 |
| 2,442,305 | Mayle | May 25, 1948 |
| 2,452,683 | Rieke | Nov. 2, 1948 |
| 2,532,534 | Bell | Dec. 5, 1950 |
| 2,574,253 | Duffy | Nov. 6, 1951 |